(12) United States Patent
Pang et al.

(10) Patent No.: US 12,246,953 B1
(45) Date of Patent: Mar. 11, 2025

(54) LARGE-SCALE TOOL HOISTING DEVICE FOR OFFSHORE ELECTRIC POWER CONSTRUCTION

(71) Applicant: POWERCHINA SEPCO1 ELECTRIC POWER CONSTRUCTION CO., LTD., Jinan (CN)

(72) Inventors: Jiyong Pang, Jinan (CN); Jianping Zhang, Jinan (CN); Guodong Shao, Jinan (CN)

(73) Assignee: POWERCHINA SEPCO1 ELECTRIC POWER CONSTRUCTION CO., LTD., Jinan (CN)

( * ) Notice: Subject to any disclaimer, the term of this patent is extended or adjusted under 35 U.S.C. 154(b) by 0 days.

(21) Appl. No.: 18/932,534

(22) Filed: Oct. 30, 2024

Related U.S. Application Data

(63) Continuation of application No. PCT/CN2023/134221, filed on Nov. 27, 2023.

(30) Foreign Application Priority Data

Jan. 4, 2023 (CN) .......................... 202310005614.8

(51) Int. Cl.
  *B66D 1/24* (2006.01)
  *B66D 1/20* (2006.01)
  *B66D 1/12* (2006.01)
  *B66D 1/74* (2006.01)

(52) U.S. Cl.
  CPC ................. *B66D 1/24* (2013.01); *B66D 1/20* (2013.01); *B66D 1/12* (2013.01); *B66D 1/7463* (2013.01)

(58) Field of Classification Search
  CPC .......... B66D 1/24; B66D 1/12; B66D 1/7463; B66D 1/20
  See application file for complete search history.

(56) References Cited

U.S. PATENT DOCUMENTS

| | | | |
|---|---|---|---|
| 5,368,279 A | 11/1994 | Ottemann et al. | |
| 2016/0025074 A1 | 1/2016 | Sato et al. | |
| 2017/0361753 A1 | 12/2017 | Wu et al. | |
| 2019/0161327 A1* | 5/2019 | Beyersdorff | ............. B66D 1/20 |

FOREIGN PATENT DOCUMENTS

CN 115676645 A 2/2023

OTHER PUBLICATIONS

Internation Search Report of PCT/CN2023/134221, Mailed Feb. 2, 2024.

* cited by examiner

*Primary Examiner* — Sang K Kim
*Assistant Examiner* — Nathaniel L Adams

(57) ABSTRACT

A large-scale tool hoisting device for offshore electric power construction is provided. A steel cable retracted to winches is dried using the heat in the operating cabin, thereby preventing the steel cable from being in a wet state for a long time and being corroded by seawater. For different loads at the terminal of the steel cable, a transmission ratio between a drive wheel and a control wheel is changed through the sliding of the drive wheel. Without changing the rotational speed of the drive motor, the moving speed of the steel cable is effectively and correspondingly improved by reducing the pulling force of the steel cable, or a large pulling force can be provided for the steel cable by reducing the moving speed of the steel cable. The transmission ratio can be changed in the hoisting process.

4 Claims, 10 Drawing Sheets

LARGE-SCALE TOOL HOISTING DEVICE FOR OFFSHORE ELECTRIC POWER CONSTRUCTION

CROSS-REFERENCE TO RELATED APPLICATIONS

This application is a continuation of International Patent Application No. PCT/CN2023/134221 with a filing date of Nov. 27, 2023, designating the United States, now pending, and further claims priority to Chinese Patent Application No. 202310005614.8 with a filing date of Jan. 4, 2023. The content of the aforementioned applications, including any intervening amendments thereto, is incorporated herein by reference.

FIELD OF THE INVENTION

The present disclosure relates to the field of hoisting devices, and particularly to a large-scale tool hoisting device for offshore electric power construction.

BACKGROUND OF THE INVENTION

A crane refers to a multi-action hoisting machine that vertically lifts and horizontally transports heavy objects within a certain range. In the related art, when some goods are transported and lifted, cranes are predominantly used for hoisting and transportation. The crane is characterized by intermittent movement, that is, the corresponding mechanisms for taking materials, transporting, and unloading in a working cycle work alternately. The development and use of cranes in the market have become increasingly widespread. The steel wire ropes used in conjunction with cranes include phosphated steel wire ropes, galvanized steel wire ropes, and smooth steel wire ropes.

Currently, in offshore operations, cranes installed on vessels are generally adopted for hoisting operations. Since cranes still adopt steel wire ropes for hoisting, and seawater contains a large number of halogen elements, electrolytes, and other corrosive substances, the steel wire rope is very easily corroded by seawater after being stained with seawater under the blowing of sea breeze so that the service life of the steel wire rope is greatly reduced, and there is also the possibility of breakage during hoisting, resulting in property damage and even casualties.

SUMMARY OF THE INVENTION

In the present disclosure, winches of a steel cable are located outside a blowing port of an operating cabin so that the heat of the heating workpiece such as a drive motor and a telescopic oil cylinder inside the operating cabin may be directly blown to the winches after being blown out. The steel cable retracted to the winches is dried using the heat in the operating cabin, thereby preventing the steel cable from being in a wet state for a long time and being corroded by seawater. Under the condition that the terminal of the steel cable is unloaded, lightly loaded, or highly loaded, a transmission ratio between a drive wheel and a control wheel is changed through the sliding of the drive wheel. Without changing the rotational speed of the drive motor, the moving speed of the steel cable is effectively and correspondingly improved by reducing the pulling force of the steel cable, or a large pulling force can be provided for the steel cable by reducing the moving speed of the steel cable. The stretching of the power gear and the transmission gear sleeve can be realized under the condition of keeping the transmission connection between the two without disconnecting. The structure is simple so that the transmission structure is easier to maintain and the transmission ratio can be changed in the hoisting process. There is no need to change the torque in the shutdown state, which is convenient to use and solves the problem that the service life of a steel wire rope is greatly reduced due to the corrosion of seawater when the steel wire rope of an offshore crane is used, thereby proposing a large-scale tool hoisting device for offshore electric power construction.

The objects of the present disclosure may be realized by the following technical solutions.

A large-scale tool hoisting device for offshore electric power construction is provided, including a chassis, where an operating cabin is fixedly installed on the chassis, and a lifting arm is rotatably connected to a top end of the operating cabin; a steel cable is slidably connected to the back of the lifting arm, and a bottom end of the steel cable is wound outside a spool; winches are rotatably connected to a side wall of the operating cabin, and the spool is fixedly installed between two sets of winches;

a control wheel is fixedly installed on an outer side of the winch, an outer edge of the control wheel is arranged with a groove, and the groove is arranged with clamping tooth grooves; an outer wall of the control wheel is wound with a transmission chain plate, and connecting teeth are fixedly installed on an inner side of the transmission chain plate; the connecting teeth correspond to the clamping tooth grooves on the control wheel; a side wall of the operating cabin is arranged with a connecting port, and the transmission chain plate passes through the connecting port and enters the inside of the operating cabin; the inside of the operating cabin is hollow; a drive motor is fixedly installed on an upper surface of the chassis, and a drive shaft is fixedly connected to an output end of the drive motor; an output shaft is movably connected to one end of the drive shaft away from the drive motor, and a drive wheel is fixedly installed on one end of the output shaft away from the drive shaft; one end of the transmission chain plate is wound on an outer wall of the drive wheel; a compensation wheel is movably connected to an inner wall of the connecting port, and an outer wall of the compensation wheel abuts against the transmission chain plate; the side wall of the operating cabin facing the spool is arranged with blowing ports, and a fan is fixedly installed on the upper surface of the chassis; the drive motor is located in the middle of the fan and the blowing port; the drive wheel is divided into a flat tooth section and a helical tooth section, and the helical tooth section is of a ladder structure; clamping teeth corresponding to the connecting teeth are fixedly installed on the outer wall of the drive wheel, and the clamping teeth in the helical tooth section are inclined.

As a preferred implementation of the present disclosure, a power gear is fixedly installed on one end of the drive shaft close to the output shaft, and a transmission gear sleeve is fixedly installed on one end of the output shaft close to the drive shaft; an inner wall of the transmission gear sleeve is arranged with clamping grooves, clamping teeth are fixedly installed on an outer wall of the power gear, and the clamping grooves of the transmission gear sleeve are engaged with the clamping teeth on the outer wall of the power gear; the power gear is slidably connected inside the transmission gear sleeve.

As a preferred implementation of the present disclosure, a positioning plate is fixedly installed on the upper surface of the chassis, and a rotating panel is rotatably connected to one side of the positioning plate facing the drive wheel; the rotating panel abuts against a side wall of the transmission chain plate; the output shaft penetrates the drive wheel, and an anti-detachment plate is fixedly installed on one end of the output shaft penetrating the drive wheel; there is a gap between the anti-detachment plate and the tail of the drive wheel.

As a preferred implementation of the present disclosure, two sets of limiting rings are fixedly installed on an outer wall of the output shaft, and a control plate is rotatably connected between the two sets of limiting rings; a bottom end of the control plate is slidably connected to the upper surface of the chassis; pull rods are fixedly installed on a bottom side wall of the control plate and fixedly connected to an output end of a telescopic oil cylinder; the telescopic oil cylinder is fixedly installed on the upper surface of the chassis, and the limiting rings and the control plate are located between the transmission gear sleeve and the drive wheel.

As a preferred implementation of the present disclosure, a side of the fan facing the drive motor is an air outlet, and the air outlet is inclined; a telescopic oil cylinder is located within an air outlet range of the fan; a side of the fan facing away from the drive motor is an air inlet.

As a preferred implementation of the present disclosure, a side wall of the connecting port is arranged with a groove, and a return spring is slidably connected inside the groove; a bottom end of the compensation wheel is fixedly installed on one end of the return spring, and the other end of the return spring is fixedly connected to the top of the groove on the connecting port.

As a preferred implementation of the present disclosure, a method for using the large-scale tool hoisting device includes the steps of:
  step 1: when the steel cable is unloaded or lightly loaded, starting a telescopic oil cylinder to drive pull rods to retract, and driving, by the pull rods, a control plate to slide on the upper surface of the chassis; pressing, by the control plate, a limiting ring so that the limiting ring drives the output shaft to move; driving, by the output shaft, the drive wheel to move in a direction towards the drive motor so that a contact part between the drive wheel and the transmission chain plate is changed from the flat tooth section to an outermost side of the helical tooth section;
  step 2: starting the drive motor to drive the drive shaft to rotate, and the drive shaft driving the output shaft to rotate through a power gear and a transmission gear sleeve; driving, by the output shaft, the drive wheel to rotate, the drive wheel driving the control wheel to rotate through the transmission chain plate, and driving, by the control wheel, the winch to rotate to lower the steel cable;
  step 3: when the steel cable is highly loaded, the telescopic oil cylinder moving in a reverse direction to drive the output shaft to move outwards, and the transmission gear sleeve on the output shaft sliding outwards outside the power gear so that the output shaft and the drive shaft keep connection; the drive wheel moving outwards, a part of the drive wheel in contact with the transmission chain plate changing towards the flat tooth section, and increasing a transmission ratio between the drive wheel and the control wheel; the compensation wheel rebounding under the action of a return spring, and the compensation wheel tightening the transmission chain plate outwards; and
  step 4: starting the drive motor, and driving the winch to rotate through the drive shaft, the output shaft, the transmission chain plate, and other components, thereby retracting the steel cable and lifting the tool.

Compared with the related art, the beneficial effects of the present disclosure are as follows.
  1. In the present disclosure, when the large-scale tool hoisting device is used, the winches of the steel cable are located outside the blowing port of the operating cabin so that the heat of the heating workpiece such as the drive motor and the telescopic oil cylinder inside the operating cabin may be directly blown to the winches after being blown out. The steel cable retracted to the winches is dried using the heat in the operating cabin, thereby preventing the steel cable from being in a wet state for a long time and being corroded by seawater.
  2. In the present disclosure, in the process of lowering or retracting the steel cable, if the terminal of the steel cable is unloaded or lightly loaded, the transmission ratio between the drive wheel and the control wheel is changed through the sliding of the drive wheel, and the moving speed of the steel cable is effectively improved without changing the rotational speed of the drive motor. When the terminal of the steel cable is highly loaded, the transmission ratio can be increased to provide a large torque for the control wheel and provide a large pulling force for the steel cable by reducing the moving speed of the steel cable.
  3. In the present disclosure, the stretching of the power gear and the transmission gear sleeve can be realized under the condition of keeping the transmission connection between the two without disconnecting. The structure is simple so that the transmission structure is easier to maintain and the transmission ratio can be changed in the hoisting process. There is no need to change the torque in the shutdown state, which is convenient to use.

BRIEF DESCRIPTION OF THE DRAWINGS

For ease of understanding by a person skilled in that art, the present disclosure is further described below in conjunction with the accompanying drawings.

Figure 1:
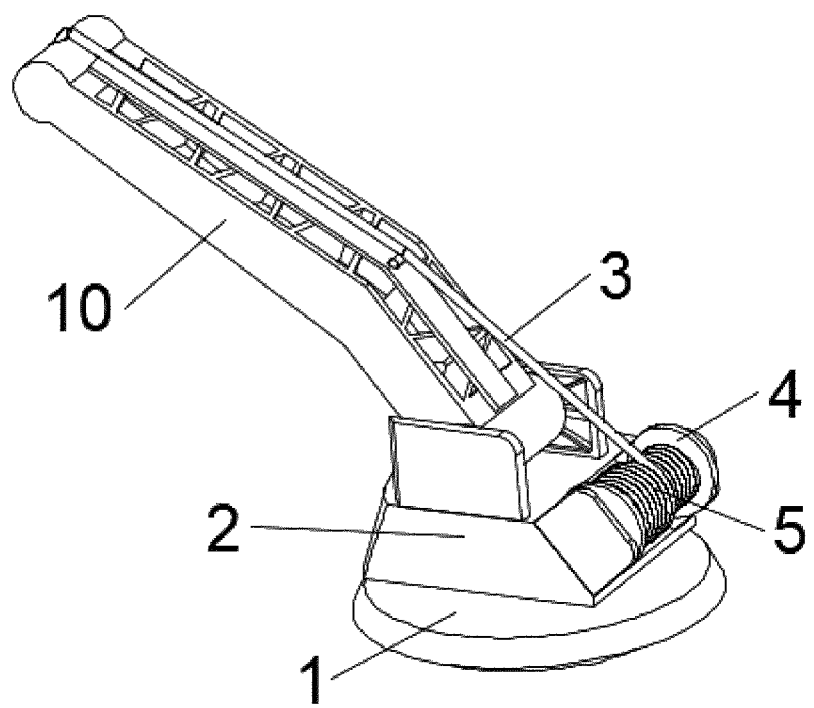
FIG. 1 is a schematic front view of a structure of the present disclosure.

In the drawings: 1—chassis; 2—operating cabin; 3—steel cable; 4—winch; 5—spool; 6—control wheel; 7—transmission chain plate; 8—connecting tooth; 9—compensation wheel; 91—return spring; 10—lifting arm; 11—connecting port; 12—drive wheel; 13—drive motor; 14—drive shaft; 15—positioning plate; 16—rotating panel; 17—anti-detachment plate; 18—control plate; 19—limiting ring; 20—fan; 21—power gear; 22—transmission gear sleeve; 23—output shaft; 24—pull rod; 25—telescopic oil cylinder; and 26—blowing port.

DETAILED DESCRIPTION OF THE EMBODIMENTS

The technical solutions of the present disclosure will be clearly and completely described below in conjunction with the embodiments. Obviously, the described embodiments are only some embodiments of the present disclosure, not all embodiments. Based on the embodiments of the present disclosure, all other embodiments obtained by a person skilled in the art without inventive effort fall within the scope of the present disclosure.

Definitions

As used herein and throughout the disclosure, the term "lightly loaded" refers to being loaded with a load less than 12% of rated load. The term "highly loaded" refers to being loaded with a load between 12% and 90% of the rated load. For security consideration, the hoisting device is prohibited to operate with a load greater than 90% of the rated load.

Embodiment 1

In offshore operations, cranes installed on vessels are generally adopted for hoisting operations. Since cranes still adopt steel wire ropes for hoisting, and seawater contains a large number of halogen elements, electrolytes, and other corrosive substances, the steel wire rope is very easily corroded by seawater after being stained with seawater under the blowing of sea breeze so that the service life of the steel wire rope is greatly reduced, and there is also the possibility of breakage during hoisting, resulting in property damage and even casualties.

Figure 2:
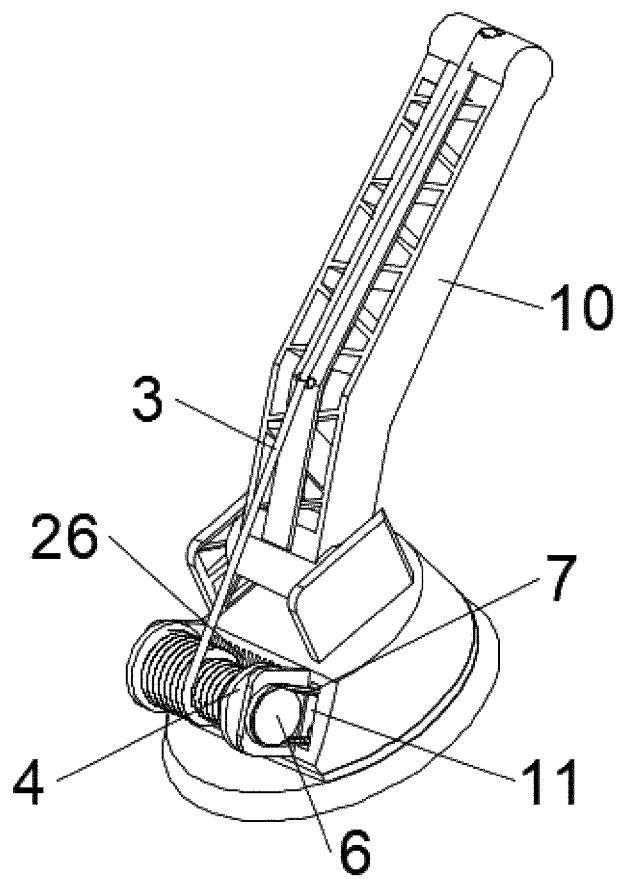
FIG. 2 is a schematic structural diagram of a control wheel of the present disclosure.
Figure 3:
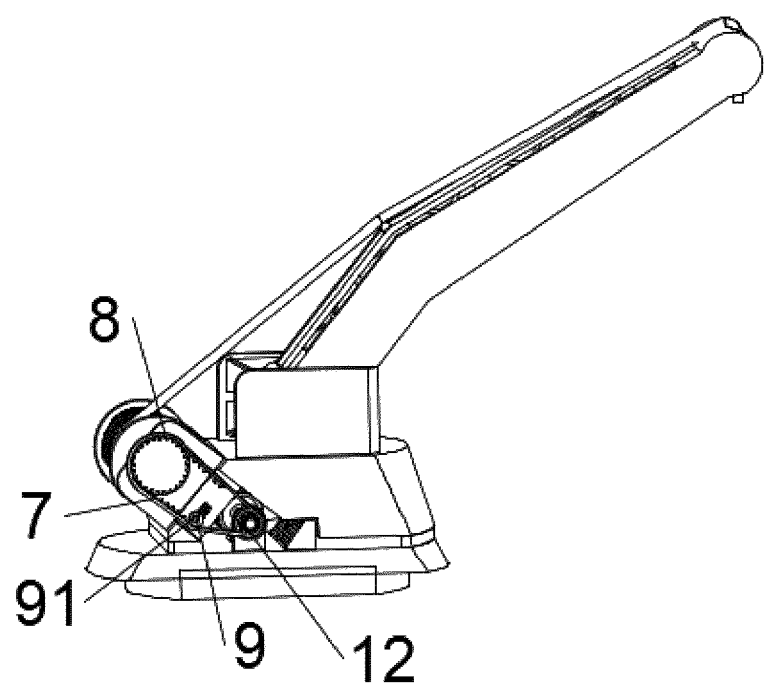
FIG. 3 is a schematic structural diagram of a transmission chain plate of the present disclosure.
Figure 4:
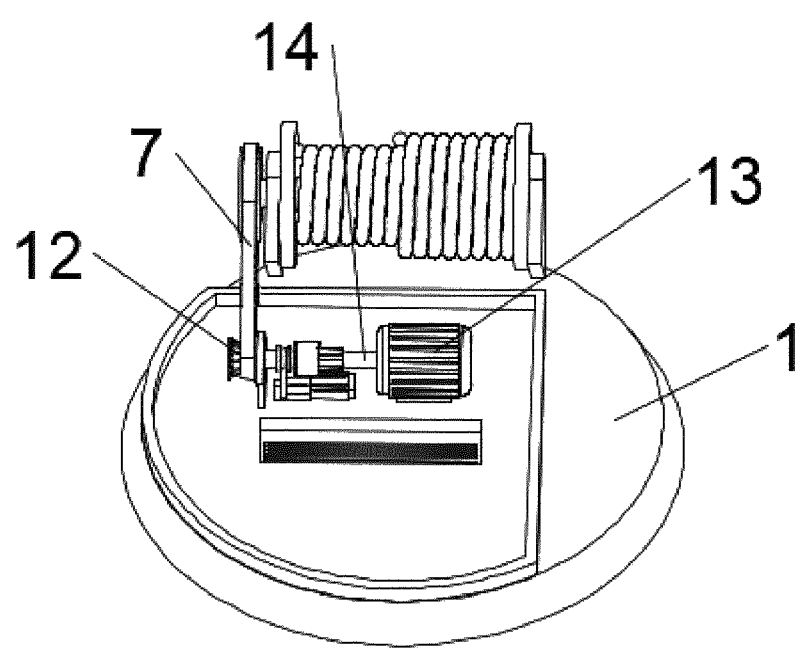
FIG. 4 is a schematic structural diagram of a drive motor of the present disclosure.
Figure 5:
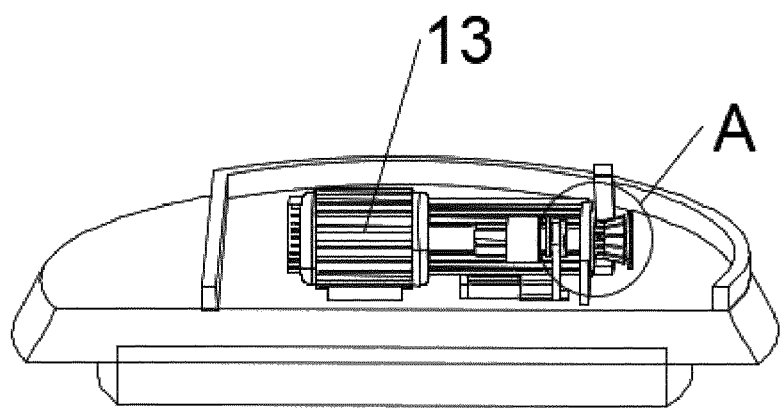
FIG. 5 is a schematic structural diagram of a drive wheel of the present disclosure.
Figure 6:
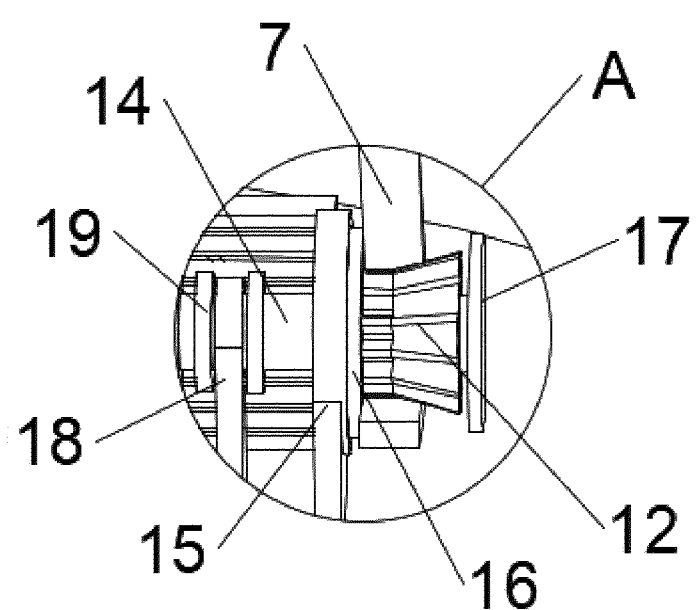
FIG. 6 is an enlarged schematic structural diagram at A of FIG. 5 of the present disclosure.
Figure 7:
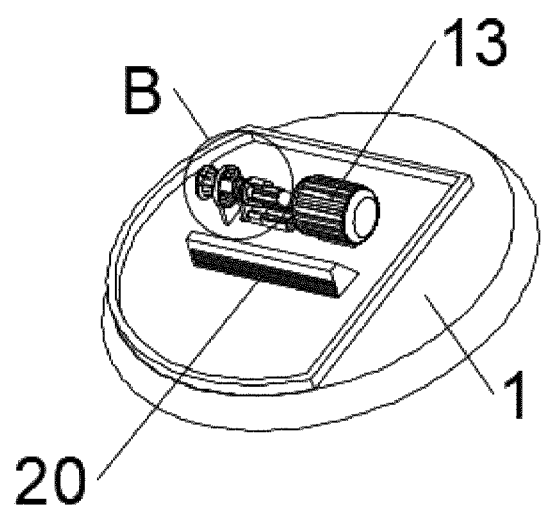
FIG. 7 is a schematic structural diagram of a transmission gear sleeve of the present disclosure.
Figure 8:
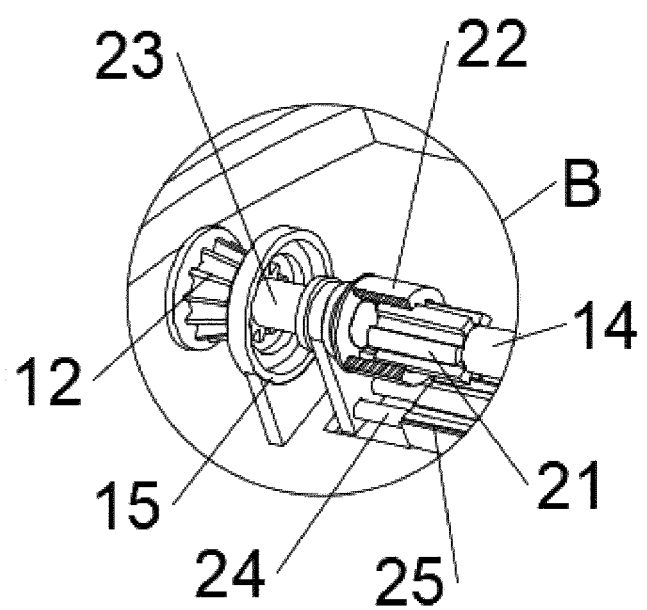
FIG. 8 is an enlarged schematic structural diagram at B of FIG. 7 of the present disclosure.
Figure 9:
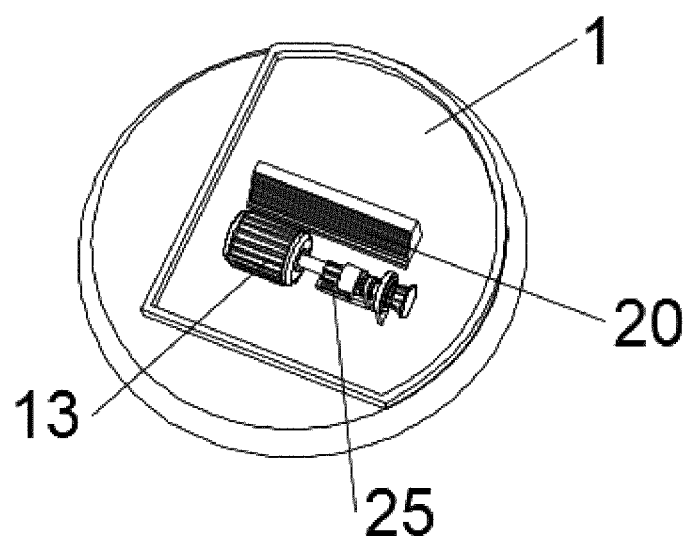
FIG. 9 is a schematic structural diagram of a fan of the present disclosure.
Figure 10:
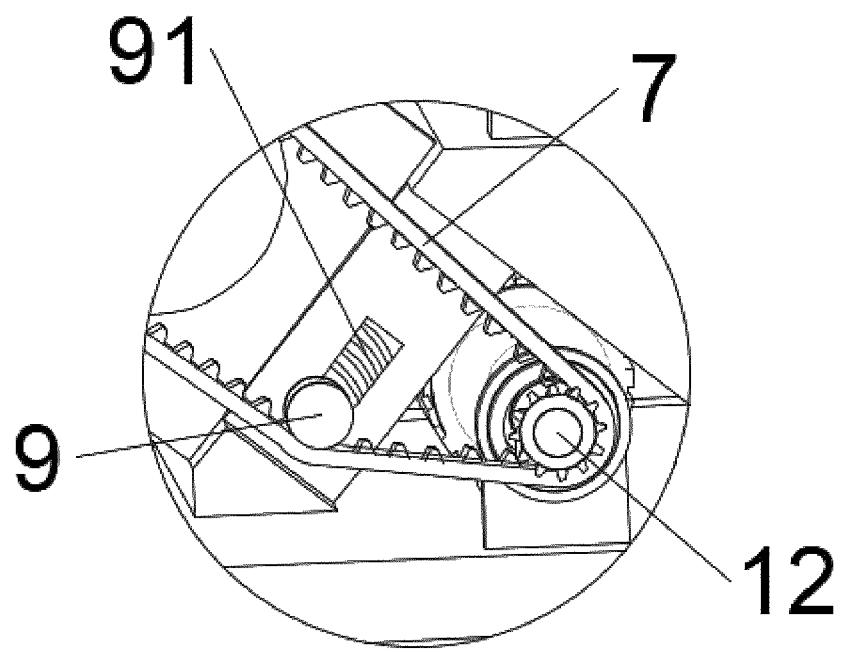
FIG. 10 is a partially enlarged view of the vicinity of a compensation wheel of the present disclosure.

Referring to FIGS. 1-9, a large-scale tool hoisting device for offshore electric power construction is provided, including a chassis 1. An operating cabin 2 is fixedly installed on the chassis 1, and the chassis 1 is connected to a rotating main shaft below, similar to the rotating main shaft of a crane in the related art, so as to realize the rotation of the chassis 1. The rotation of the chassis 1 drives the whole hoisting device to rotate. A lifting arm 10 is rotatably connected to a top end of the operating cabin 2, and a lower part of the lifting arm 10 is supported by a hydraulic rod to realize the lifting and lowering of the lifting arm 10. A plate material is fixedly installed on the back of the lifting arm 10, and a plurality of sets of rollers are rotatably connected to the plate material to ensure that a steel cable 3 will not be rubbed by the lifting arm 10 when moving on the back of the lifting arm 10, thereby ensuring the service life of the steel cable 3. The steel cable 3 is slidably connected to the back of the lifting arm 10, and a bottom end of the steel cable 3 is wound outside a spool 5. Winches 4 are rotatably connected to a side wall of the operating cabin 2, and the spool 5 is fixedly installed between two sets of winches 4. The rotation of the winches 4 drives the spool 5 to rotate, and the rotation of the spool 5 drives the winches 4 to rotate to retract or release the steel cable 3.

A control wheel 6 is fixedly installed on an outer side of the winch 4, an outer edge of the control wheel 6 is arranged with a groove, and the groove is arranged with clamping tooth grooves. An outer wall of the control wheel 6 is wound with a transmission chain plate 7, and connecting teeth 8 are fixedly installed on an inner side of the transmission chain plate 7. The connecting teeth 8 correspond to the clamping tooth grooves on the control wheel 6 to improve the transmission effect of the transmission chain plate 7 and the control wheel 6 and prevent the transmission chain plate 7 from slipping on the control wheel 6. A side wall of the operating cabin 2 is arranged with a connecting port 11, and the transmission chain plate 7 passes through the connecting port 11 and enters the inside of the operating cabin 2, and the transmission chain plate 7 is driven to rotate through the assemblies inside the operating cabin 2. The operating cabin 2 is hollow inside and snaps above the chassis 1 so that assemblies inside the operating cabin 2 can be installed above the chassis 1. A drive motor 13 is fixedly installed on an upper surface of the chassis 1 and located in a hollow part of the operating cabin 2. A drive shaft 14 is fixedly connected to an output end of the drive motor 13, and the drive shaft 14 is driven to rotate through the drive motor 13. A power gear 21 is fixedly installed on one end of the drive shaft 14 close to the output shaft 23, and a transmission gear sleeve 22 is fixedly installed on one end of the output shaft 23 close to the drive shaft 14. An inner wall of the transmission gear sleeve 22 is arranged with clamping grooves, clamping teeth are fixedly installed on an outer wall of the power gear 21, and the clamping grooves of the transmission gear sleeve 22 are engaged with the clamping teeth on the outer wall of the power gear 21 so that the transmission gear sleeve 22 can be driven to rotate when the power gear 21 rotates. When the drive shaft 14 rotates, the power gear 21 rotates to drive the transmission gear sleeve 22 to rotate, and the transmission gear sleeve 22 drives the output shaft 23 to rotate. The power gear 21 is slidably connected inside the transmission gear sleeve 22. When the output shaft 23 moves axially, the transmission gear sleeve 22 moves along with the output shaft 23, and the connection between the transmission gear sleeve 22 and the power gear 21 is not interrupted so that the transmission gear sleeve 22 can not only rotate under the driving of the power gear 21, but also move axially through the pulling of the output shaft 23, thereby realizing the connection between the drive shaft 14 and the output shaft 23. A drive wheel 12 is fixedly installed on one end of the output shaft 23 away from the drive shaft 14, and the drive wheel 12 is driven to rotate through the output shaft 23. One end of the transmission chain plate 7 is wound on an outer wall of the drive wheel 12, and the transmission chain plate 7 is driven to rotate through the rotation of the drive wheel 12. A positioning plate 15 is fixedly installed on the upper surface of the chassis 1, and a rotating panel 16 is rotatably connected to one side of the positioning plate 15 facing the drive wheel 12. The rotating panel 16 abuts against a side wall of the transmission chain plate 7 to ensure that the transmission chain plate 7 will not swing. The output shaft 23 penetrates the drive wheel 12, and an anti-detachment plate 17 is fixedly installed on one end of the output shaft 23 penetrating the drive wheel 12. There is a gap between the anti-detachment plate 17 and the tail of the drive wheel 12 so that the transmission chain plate 7 does not slip outwards when a side of the drive wheel 12 having the largest diameter is connected to the transmission chain plate 7. A compensation wheel 9 is movably connected to an inner wall of the connecting port 11. A side wall of the connecting port 11 is arranged with a groove, and a return spring 91 is slidably connected inside the groove. A bottom end of the compensation wheel 9 is fixedly installed on one end of the return spring 91, and the other end of the return spring 91 is fixedly connected to the top of the groove on the connecting port 11. When the connection position of the drive wheel 12 and the transmission chain plate 7 changes, the tension in the transmission chain plate 7 increases due to the increase of the diameter of the drive wheel 12. At this time, the transmission chain plate 7 presses the compensation wheel 9, and the compensation wheel 9 compresses the return spring 91 to ensure the constant tension in the transmission chain plate 7 and prevent the transmission chain plate 7 from being broken. An outer wall of the compensation wheel 9 abuts against the transmission chain plate 7. The side wall of the operating cabin 2 facing the spool 5 is arranged with blowing ports 26, and a fan 20 is fixedly installed on the upper surface of the chassis 1. A side of the fan 20 facing the drive motor 13 is an air outlet, and the air outlet is inclined. A telescopic oil cylinder 25 is located within an air outlet range of the fan 20. A side of the fan 20 facing away from the drive motor 13 is an air inlet. When the drive motor 13 and the telescopic oil cylinder 25 are operated, the fan 20 is also operated so that the heat of the drive motor 13 and the telescopic oil cylinder 25 is dissipated by the blowing of the fan 20, and the heat is blown out from the blowing port 26. The outer side of the blowing port 26 is the winch 4, and the steel cable 3 on the winch 4 is dried by hot wind so that the steel cable 3 is prevented from being corroded by seawater through a dry environment, and the service life of the steel cable 3 is prolonged. The drive motor 13 is located in the middle of the fan 20 and the blowing port 26. The drive wheel 12 is divided into a flat tooth section and a helical tooth section, and the helical tooth section is of a ladder structure. The number of teeth on the helical tooth section is larger than the number of teeth on the flat tooth section, and the number of teeth on the helical tooth section increases evenly with the increase of the diameter. The clamping teeth on the flat tooth section and the clamping teeth on the helical tooth section adopt a smooth transition so that when the helical tooth section is connected to the transmission chain plate 7, the transmission chain plate 7 has a lower rotational speed and a larger torque. Clamping teeth corresponding to the connecting teeth 8 are fixedly installed on the outer wall of the drive wheel 12, and the clamping teeth in the helical tooth section are inclined. Two sets of limiting rings 19 are fixedly installed on an outer wall of the output shaft 23, and a control plate 18 is rotatably connected between the two sets of limiting rings 19. A bottom end of the control plate 18 is slidably connected to the upper surface of the chassis 1. Pull rods 24 are fixedly installed on a bottom side wall of the control plate 18 and fixedly connected to an output end of a telescopic oil cylinder 25. The telescopic oil cylinder 25 electrically drives the pull rods 24 to move axially, and the pull rods 24 electrically drive the control plate 18 to move horizontally. When the control plate 18 moves horizontally, the limit ring 19 in the corresponding direction electrically drives the output shaft 23 to move left and right. The telescopic oil cylinder 25 is fixedly installed on the upper surface of the chassis 1, and the limiting rings 19 and the control plate 18 are located between the transmission gear sleeve 22 and the drive wheel 12 to improve the heat dissipation effect of the fan 20 on the telescopic oil cylinder 25, and meanwhile increase the temperature of the airflow blown out of the fan 20 from the blowing port 26.

Combining embodiment 1, the working principle is as follows.

When the steel cable 3 is unloaded or lightly loaded, a telescopic oil cylinder 25 is started to drive the pull rods 24 to retract, and the pull rods 24 drives the control plate 18 to slide on the upper surface of the chassis 1. The control plate 18 presses the limiting ring 19 so that the limiting ring 19 drives the output shaft 23 to move. The output shaft 23 drives the drive wheel 12 to move in a direction towards the drive motor 13 so that a contact part between the drive wheel 12 and the transmission chain plate 7 is changed from the flat tooth section to an outermost side of the helical tooth section. The drive motor 13 is started to drive the drive shaft 14 to rotate, and the drive shaft 14 drives the output shaft 23 to rotate through the power gear 21 and the transmission gear sleeve 22. The output shaft 23 drives the drive wheel 12 to rotate, the drive wheel 12 drives the control wheel 6 to rotate through the transmission chain plate 7, and the control wheel 6 drives the winch 4 to rotate to lower the steel cable 3. When the steel cable 3 is highly loaded, the telescopic oil cylinder 25 moves in a reverse direction to drive the output shaft 23 to move outwards, and the transmission gear sleeve 22 on the output shaft 23 slides outwards outside the power gear 21 so that the output shaft 23 and the drive shaft 14 keep connection. The drive wheel 12 moves outwards, a part of the drive wheel 12 in contact with the transmission chain plate 7 changes towards the flat tooth section, and a transmission ratio between the drive wheel 12 and the control wheel 6 is increased. The compensation wheel 9 rebounds under the action of the return spring 91, and the compensation wheel 9 tightens the transmission chain plate 7 outwards. The drive motor 13 is started, and the winch 4 is driven to rotate through the drive shaft 14, the output shaft 23, the transmission chain plate 7, and other components, thereby retracting the steel cable 3 and lifting the tool.

What is claimed is:

1. A large-scale tool hoisting device for offshore electric power construction, comprising a chassis (1), wherein an operating cabin (2) is fixedly installed on the chassis (1), and a lifting arm (10) is rotatably connected to a top end of the operating cabin (2); a steel cable (3) is slidably connected to a back of the lifting arm (10), and a bottom end of the steel cable (3) is wound outside a spool (5); a winch (4) is rotatably connected to a side wall of the operating cabin (2), and the spool (5) is fixedly installed on the winch (4);

a control wheel (6) is fixedly installed on an outer side of the winch (4), an outer edge of the control wheel (6) is arranged with a groove, and the groove is arranged with clamping tooth grooves; an outer wall of the control wheel (6) is wound with a transmission chain plate (7), and connecting teeth (8) are fixedly installed on an inner side of the transmission chain plate (7); the connecting teeth (8) correspond to the clamping tooth grooves on the control wheel (6); a side wall of the operating cabin (2) is arranged with a connecting port (11), and the transmission chain plate (7) passes through the connecting port (11) and enters an inside of the operating cabin (2); the inside of the operating cabin (2) is hollow; a drive motor (13) is fixedly installed on an upper surface of the chassis (1), and a drive shaft (14) is fixedly connected to an output end of the drive motor (13); an output shaft (23) is movably connected to one end of the drive shaft (14) away from the drive motor (13), and a drive wheel (12) is fixedly installed on one end of the output shaft (23) away from the drive shaft (14); one end of the transmission chain plate (7) is wound on an outer wall of the drive wheel (12); a compensation wheel (9) is movably connected to an inner wall of the connecting port (11), and an outer wall of the compensation wheel (9) abuts against the transmission chain plate (7); the side wall of the operating cabin (2) facing the spool (5) is arranged with blowing ports (26), and a fan (20) is fixedly installed on the upper surface of the chassis (1); the drive motor (13) is located in a middle of the fan (20) and the blowing port (26); the drive wheel (12) is divided into a flat tooth section and a slanted portion, and the slanted portion is of a ladder structure; clamping teeth corresponding to the connecting teeth (8) are fixedly installed on the outer wall of the drive wheel (12), and the clamping teeth in the slated portion are inclined;

wherein a power gear (21) is fixedly installed on one end of the drive shaft (14) close to the output shaft (23), and a transmission gear sleeve (22) is fixedly installed on one end of the output shaft (23) close to the drive shaft (14); an inner wall of the transmission gear sleeve (22) is arranged with clamping grooves, clamping teeth are fixedly installed on an outer wall of the power gear (21), and the clamping grooves of the transmission gear sleeve (22) are engaged with the clamping teeth on the outer wall of the power gear (21); the power gear (21) is slidably connected inside the transmission gear sleeve (22);

wherein a positioning plate (15) is fixedly installed on the upper surface of the chassis (1), and a rotating panel (16) is rotatably connected to one side of the positioning plate (15) facing the drive wheel (12); the rotating panel (16) abuts against a side wall of the transmission chain plate (7); the output shaft (23) penetrates the drive wheel (12), and an anti-detachment plate (17) is fixedly installed on one end of the output shaft (23) penetrating the drive wheel (12); there is a gap between the anti-detachment plate (17) and the tail of the drive wheel (12);

wherein two limiting rings (19) are fixedly installed on an outer wall of the output shaft (23), and a control plate (18) is rotatably connected between the limiting rings (19); a bottom end of the control plate (18) is slidably connected to the upper surface of the chassis (1); pull rods (24) are fixedly installed on a bottom side wall of the control plate (18) and fixedly connected to an output end of a telescopic oil cylinder (25); the telescopic oil cylinder (25) is fixedly installed on the upper surface of the chassis (1), and the limiting rings (19) and the control plate (18) are located between the transmission gear sleeve (22) and the drive wheel (12).

2. The large-scale tool hoisting device for offshore electric power construction according to claim 1, wherein a side of the fan (20) facing the drive motor (13) is an air outlet, and the air outlet is inclined; the telescopic oil cylinder (25) is located at the fan (20); a side of the fan (20) facing away from the drive motor (13) is an air inlet.

3. The large-scale tool hoisting device for offshore electric power construction according to claim 1, wherein a side wall of the connecting port (11) is arranged with a groove, and a return spring (91) is slidably connected inside the groove; a bottom end of the compensation wheel (9) is fixedly installed on one end of the return spring (91), and the other end of the return spring (91) is fixedly connected to the top of the groove on the connecting port (11).

4. The large-scale tool hoisting device for offshore electric power construction according to claim 1, wherein a method for using the large-scale tool hoisting device comprises:

step 1: when the steel cable (3) is unloaded or lightly loaded, starting the telescopic oil cylinder (25) to drive pull rods (24) to retract, and driving, by the pull rods (24), the control plate (18) to slide on the upper surface of the chassis (1); pressing, by the control plate (18), the limiting ring (19) so that the limiting ring (19) drives the output shaft (23) to move; driving, by the output shaft (23), the drive wheel (12) to move in a direction towards the drive motor (13) so that a contact part between the drive wheel (12) and the transmission chain plate (7) is changed from the flat tooth section to an outermost side of the slanted portion;

step 2: starting the drive motor (13) to drive the drive shaft (14) to rotate, and the drive shaft (14) driving the output shaft (23) to rotate through the power gear (21) and the transmission gear sleeve (22); driving, by the output shaft (23), the drive wheel (12) to rotate, the drive wheel (12) driving the control wheel (6) to rotate through the transmission chain plate (7), and driving, by the control wheel (6), the-winch (4) to rotate to lower the steel cable (3);

step 3: when the steel cable (3) is highly loaded, the telescopic oil cylinder (25) moving in a reverse direction to drive the output shaft (23) to move outwards, and the transmission gear sleeve (22) on the output shaft (23) sliding outwards outside the power gear (21) so that the output shaft (23) and the drive shaft (14) keep connection; the drive wheel (12) moving outwards, a part of the drive wheel (12) in contact with the transmission chain plate (7) changing towards the flat tooth section, and increasing a transmission ratio between the drive wheel (12) and the control wheel (6); the compensation wheel (9) rebounding under the action of a return spring (91), and the compensation wheel (9) tightening the transmission chain plate (7) outwards; and step 4: starting the drive motor (13) to drive the drive shaft (14) to rotate, and the drive shaft (14) driving the output shaft (23) to rotate through the power gear (21) and the transmission gear sleeve (22); driving, by the output shaft (23), the drive wheel (12) to rotate, the drive wheel (12) driving the control wheel (6) to rotate through the transmission chain plate (7), and driving, by the control wheel (6), the winch (4) to rotate, thereby retracting the steel cable (3) and lifting the tool.

* * * * *